United States Patent [19]

Lescaut

[11] Patent Number: 4,725,507
[45] Date of Patent: Feb. 16, 1988

[54] METALLOPLASTIC COMPOSITE CONTAINERS AND METHOD OF MAKING THE SAME

[75] Inventor: Pierre L. Lescaut, Bernay, France

[73] Assignee: Atochem, France

[21] Appl. No.: 934,161

[22] Filed: Nov. 24, 1986

[30] Foreign Application Priority Data

Nov. 29, 1985 [FR] France ............... 85 17736

[51] Int. Cl.⁴ .................................................. B22F 3/00
[52] U.S. Cl. ............................ 428/551; 220/1 B;
220/5 A; 220/75; 220/456; 220/DIG. 29;
228/196; 413/8; 413/18; 428/625; 428/626;
428/458; 428/461; 428/462; 428/463
[58] Field of Search ............ 220/1 B, 5 A, 75, 456,
220/DIG. 29; 413/8, 18; 228/196; 428/625,
626, 551, 458, 461, 462, 463

[56] References Cited

U.S. PATENT DOCUMENTS

| | | | |
|---|---|---|---|
| 2,480,376 | 8/1949 | Martin | 220/DIG. 29 |
| 2,613,015 | 10/1952 | Keating | 220/DIG. 29 |
| 2,801,024 | 7/1957 | Osborne | 220/DIG. 29 |
| 2,993,617 | 7/1961 | Briggs | 220/DIG. 29 |
| 3,596,793 | 8/1971 | Kocher et al. | 220/DIG. 29 |
| 3,710,401 | 1/1973 | Goettl | 220/75 |
| 4,181,237 | 1/1980 | Kenyon et al. | 220/75 |
| 4,562,934 | 1/1986 | Hammond | 220/75 |

Primary Examiner—Stephen J. Lechert, Jr.
Attorney, Agent, or Firm—Sigalos & Levine

[57] ABSTRACT

A large volume metallic composite container consisting essentially of a plurality of metal plates welded end-to-end, each said metal plate having a stainless metallic layer on the periphery of at least one side thereof and on the ends thereof and a heat-sensitive anti-corrosion coating consisting essentially of a thermoplastic resin on at least one side of each said metal plate and overlapping said stainless metallic layers over a length of at least about 10 mm and at least about 10 mm from the weld used to weld the plates together. The process of making of such containers is also disclosed.

4 Claims, 2 Drawing Figures

METALLOPLASTIC COMPOSITE CONTAINERS AND METHOD OF MAKING THE SAME

BACKGROUND OF THE INVENTION

The present invention relates to assembly by autogenic welding of containers of large capacity (10,000 liters and above) constituted of several metalloplastic composite plates welded edge-to-edge. These containers are to be used for the storage of various chemical products, such as petroleum liquids, water, chemical solutions, and washing compositions.

SUMMARY OF THE INVENTION

The present invention provides containers and a process of making the same without degradation of the plastic linings.

Briefly, the present invention comprises large volume metallic composite containers consisting essentially of a plurality of metal plates welded end-to-end, each said metal plate having a stainless metallic layer on the periphery of at least one side thereof and on the ends thereof and an anti-corrosion coating consisting essentially of a thermoplastic resin on at least one side of each said metal plate and overlapping said stainless metallic layers over a length of at least about 10 mm and at least about 10 mm from the weld used to weld the plates together.

The invention also comprises the process of making such containers as hereinafter set forth.

DETAILED DESCRIPTION

The process comprises a first step of treating the plates carried out in the workshop. On their periphery over a width (measured starting from each edge) of between 20 and 30 mm, the plates receive a coating, accomplished with the help of an oxyacetylene blowtorch according to the Schoop metal spraying process of a stainless metallic alloy composed of iron and one of the metals of the chromium, nickel, cobalt group. This alloy is generally applied as a powder, and it is placed likewise on the edges of the plates.

Depending on the applications, the thickness of the alloy deposited varies from 200 to 600 microns.

After this first step, and also carried out in the workshop, an anti-corrosion coating which can be composed of thermoplastic resins selected from the polyamides, fluorinated resins, polyethylenes or polyvinyl chloride is deposited on the wall or walls of the plates.

These resins are advantageously applied starting with fine powders of a granulometry of between 10 and 400 microns and by known processes, such as electrostatic precipitation or the use of a spray gun.

A distance of between 10 and 20 mm along the periphery on each edge of the plates to be assembled is not coated with resin in order to preserve the heat-sensitive anti-corrosion coating from melting or from pyrolysis caused by the temperature rise during the autogenic welding operation carried out in the third step in the workshop for the assembly of the plates.

The uncoated distance on each edge and the width coated with stainless metallic alloy deposited previously must be such that the heat-sensitive anti-corrosion coating always covers the stainless metallic deposit in such a way as to ensure the continuity of the protection of the wall of the plate which one wishes to protect.

The zone of covering of the metal alloy layer with anti-corrosion coating must not be less than 10 mm measured in the direction of the perpendicular line to the edge under consideration in order to obtain the continuity of the protecting coatings with safety.

The relative arrangement of the layers of the two coatings and the present invention will be further described in connection with the drawings.

Figure 1:
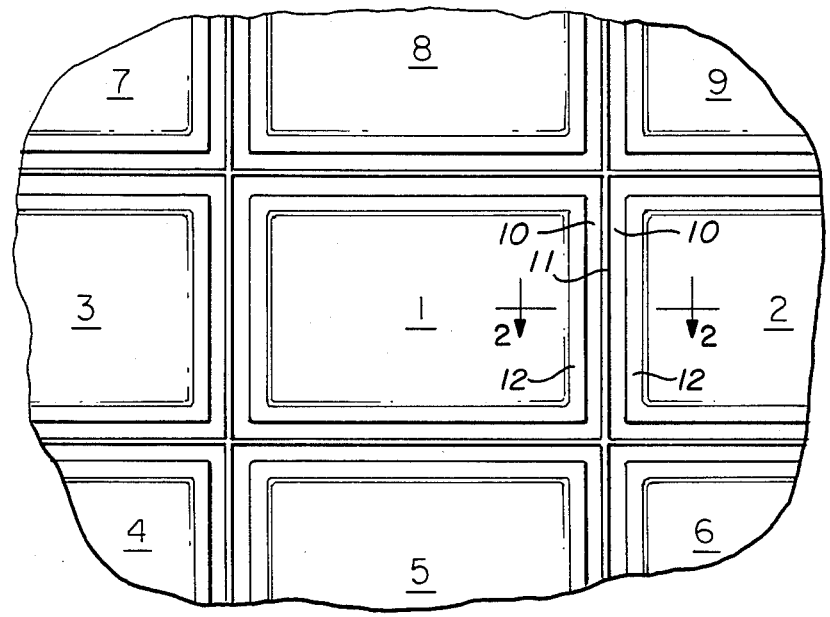
FIG. 1 is a partial top plan of plates assembled in accordance with the present invention.
Figure 2:
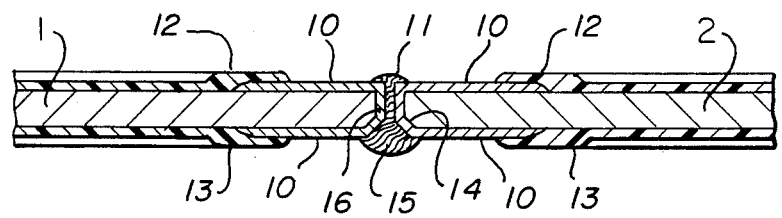
FIG. 2 is a sectional view taken along line 2—2 of FIG. 1.

Referring to FIG. 1 and there are shown a series of plates 1 to 9. Each is layered with the stainless metal alloy 10 on both sides of each of the assembly plates. The joints 16 between each plate have a projection 11 of stainless alloy applied with the oxyacetylene spray gun. The coatings 12 an 13 of the heat-sensitive coating cover the surfaces of the plates and also a portion of the stainless metal layers.

The outer edges of the facing of the two plates are bevelled 14 in such a way that the bottom of the bevel which is in the shape of a groove can be filled with stainless metal 15 furnished by a wire of an alloy of composition identical to that of the stainless metal coating applied during the course of the first step. Thus, there is established the connection between the stainless coatings of the two extremities of the abutting plates.

If only one side of the container walls is to be given an anti-corrosion coating, the remainder of the space between the plates is filled with a metal by welding of the metal wire utilizing the metal constituting the plate.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A large volume metallic composite container consisting essentially of a plurality of metal plates welded end-to-end, each said metal plate having a stainless metallic layer on the periphery of at least one side thereof and on the ends thereof and a heat-sensitive anti-corrosion coating consisting essentially of a thermoplastic resin on at least one side of each said metal plate and overlapping said stainless metallic layers over a length of at least about 10 mm and at least about 10 mm from the weld used to weld the plates together.

2. The metallic container of claim 1, wherein stainless metallic layer has anti-corrosion properties and is obtained from an alloy of at least one of the metals of the chromium, nickel, cobalt group alloyed with iron.

3. The metallic container of claim 1 or 2, wherein the heat-sensitive anti-corrosion coating consists essentially of a thermoplastic resin selected from polyamide resins, fluorinated resins, polyethylenes, or polyvinyl chloride.

4. The process of making large volume metallic containers comprising edge-to-edge welding of a plurality of plates to form a container of the shape and size desired, each of said plurality of plates before welding being first provided at their ends and about the periphery of at least the interior side thereof with a layer of stainless metal alloy of a thickness of about 200 to 600 microns and at least the interior side of each of said plurality of plates coated withy a heat-sensitive anti-corrosion thermoplastic resin coating with said coating overlapping said metallic layer over a width of at least about 10 mm and at least 10 mm from where the welding together of the plates takes place, and welding said plates together.

* * * * *